(12) United States Patent
Naisbitt et al.

(10) Patent No.: US 12,521,460 B2
(45) Date of Patent: Jan. 13, 2026

(54) AIR FRESHENER AND SUBSTANCE DIFFUSING MEMBRANE WITH REMOVABLE SEAL

(71) Applicant: Energizer Brands II, LLC, St. Louis, MO (US)

(72) Inventors: Chase Southwick Naisbitt, Lakewood, OH (US); Michael Raymond Stallard, Wellington, OH (US)

(73) Assignee: Energizer Group Limited, High Wycombe (GB)

( * ) Notice: Subject to any disclaimer, the term of this patent is extended or adjusted under 35 U.S.C. 154(b) by 955 days.

(21) Appl. No.: 17/581,507

(22) Filed: Jan. 21, 2022

(65) Prior Publication Data
US 2022/0233737 A1  Jul. 28, 2022

Related U.S. Application Data

(60) Provisional application No. 63/141,184, filed on Jan. 25, 2021.

(51) Int. Cl.
*A61L 9/01* (2006.01)
*B32B 15/085* (2006.01)
(Continued)

(52) U.S. Cl.
CPC .............. *A61L 9/01* (2013.01); *B32B 15/085* (2013.01); *B32B 15/20* (2013.01); *B32B 27/32* (2013.01);
(Continued)

(58) Field of Classification Search
CPC ... B32B 15/085; B32B 15/20; B32B 2435/02; B32B 27/32; B32B 2255/10; B32B 2255/20; A61L 2209/131; A61L 2209/135; A61L 9/12; A61L 9/01; B65D 75/32; B65D 25/00; B65D 53/00; F24F 8/50; C08J 5/18; C08J 2323/06
See application file for complete search history.

(56) References Cited

U.S. PATENT DOCUMENTS

| 5,788,155 | A | 8/1998 | Martin et al. |
| 9,327,045 | B2 | 5/2016 | Bourne |
| 2017/0000102 | A1 | 1/2017 | Parrinello |

FOREIGN PATENT DOCUMENTS

| EP | 1076014 A2 | 2/2001 |
| EP | 1487505 B1 | 12/2004 |

(Continued)

OTHER PUBLICATIONS

Office Action for related European Application No. 22152910.0, dated Dec. 20, 2024, 6 pages.

(Continued)

*Primary Examiner* — Michael C Miggins
(74) *Attorney, Agent, or Firm* — Lee & Hayes, P.C.

(57) ABSTRACT

An air freshener includes a reservoir for storing a liquid fragrant substance, the reservoir has a cavity and an opening to the cavity. A permeable membrane is coupled to the reservoir and has a first surface facing the cavity that covers the opening and a second surface facing away from the cavity. A laminate removable seal includes a metallic layer and a sealing layer, the laminate removable seal is disposed on the second surface of the permeable membrane. The sealing layer is removably adhered to substantially the entirety of the second surface of the permeable membrane.

20 Claims, 4 Drawing Sheets

(51) Int. Cl.
    *B32B 15/20*     (2006.01)
    *B32B 27/32*     (2006.01)
    *C08J 5/18*     (2006.01)

(52) U.S. Cl.
    CPC ........... *C08J 5/18* (2013.01); *A61L 2209/131* (2013.01); *B32B 2255/10* (2013.01); *B32B 2255/20* (2013.01); *B32B 2435/02* (2013.01); *C08J 2323/06* (2013.01)

(56) References Cited

FOREIGN PATENT DOCUMENTS

| | | |
|---|---|---|
| EP | 2419148 A1 | 2/2012 |
| WO | WO9425370 A1 | 11/1994 |

OTHER PUBLICATIONS

Extended European Search Report mailed Jun. 24, 2022 for European Patent Application No. 22152910.0, 9 pages.
Office Action issued by the European Patent Office on Sep. 13, 2023 for related Application No. 22152910.0, a foreign counterpart to U.S. Appl. No. 17/581,507 (8 pages).
Extended Search Report issued by the European Patent Office on Jun. 24, 2022 for related European Patent Application No. 22152910.0 (9 pages).
Notification of Office Action for related Chinese Application No. 202210089467.2, dated Jun. 26, 2025, 13 pages.
Notification of the Second Office Action for related Chinese Application No. 202210089467.2, dated Nov. 13, 2025 (19 pages).
Mascia, "The role of additives in plastics", Edward Arnold Ltd. (Publishers), London, 1974, (6 pages).

AIR FRESHENER AND SUBSTANCE DIFFUSING MEMBRANE WITH REMOVABLE SEAL

CROSS-REFERENCE TO RELATED APPLICATIONS

This application claims priority to U.S. Provisional Application Ser. No. 63/141,184, filed on Jan. 25, 2021, the contents of which are hereby incorporated by reference in its entirety.

BACKGROUND

The field of the disclosure relates generally to air fresheners. More specifically, the disclosure relates to membranes for use with a fragrant material for dispersion through the membrane.

Air fresheners can be used to provide an aesthetically pleasing aroma in a desired location. Some known air fresheners use a liquid volatile substance, such as a liquid oil, that is held in an air tight container during use. In use, the volatile substance permeates through a membrane to release the desired aroma. Prior to use, the membrane is sealed by a cover that is removed to expose the membrane and allow the volatile substance to permeate through the membrane. However, the covers for the membranes of known air fresheners may leak, or allow the volatile substance to accumulate between the membrane and the cover, such that the volatile substance may undesirably drip or leak out once the cover is removed.

The present disclosure provides a membrane and seal that reduces or eliminates the amount of accumulation of liquid between the membrane and seal prior to use.

BRIEF DESCRIPTION

It has been recognized that it would be advantageous to develop an air freshener to provide a desired scent. In addition, it has been recognized that fragrant material can pass through the permeable membrane and undesirably pool between the membrane and the liner or cover, to leak from the air freshener as the liner or cover is removed. Furthermore, it has been recognized that it would be advantageous to develop an air freshener that resists spilling, leaking, or pooling of fragrant material that build up between a permeable membrane and a liner or cover prior to use.

In one embodiment an air freshener includes a reservoir for storing a liquid fragrant substance, the reservoir has a cavity and an opening to the cavity. A permeable membrane is coupled to the reservoir and has a first surface facing the cavity that covers the opening and a second surface facing away from the cavity. A laminate removable seal includes a metallic layer and a sealing layer, the laminate removable seal is disposed on the second surface of the permeable membrane. The sealing layer is removably adhered to substantially the entirety of the second surface of the permeable membrane.

In another embodiment, a method of sealing a reservoir containing a fragrant liquid is disclosed. The reservoir includes a cavity containing the fragrant liquid and an opening to the cavity. The method includes covering the opening with a permeable membrane having a first surface facing the cavity and a second surface facing away from the cavity. The method includes applying a laminate removable seal comprising a metallic layer and a sealing layer to the second surface of the permeable membrane and applying heat and pressure to the laminate removable seal such that the sealing layer is removably adhered across substantially the entirety of the second surface of the permeable membrane.

DETAILED DESCRIPTION

Figure 1:
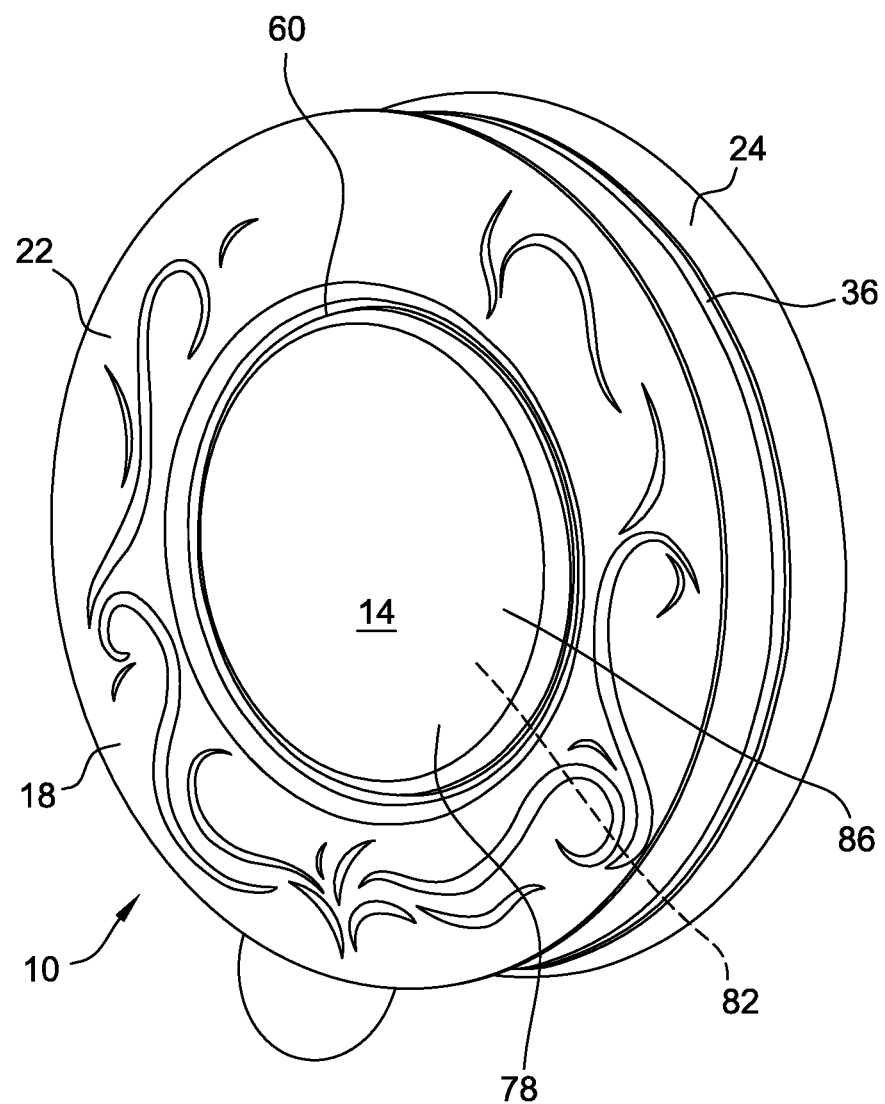
FIG. 1 is a perspective view of an air freshener in accordance with an embodiment of the present disclosure.
Figure 2:
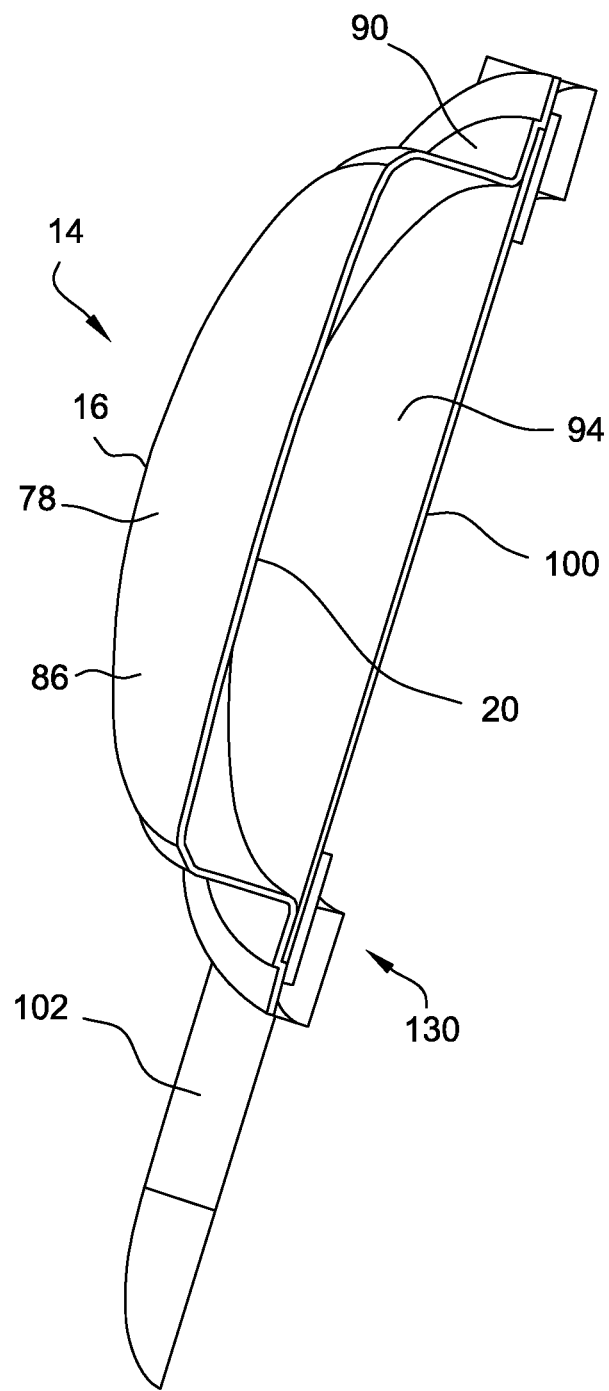
FIG. 2 is a cross-sectional view of scent capsule including a substance diffusing membrane according to the present disclosure.
Figure 3:
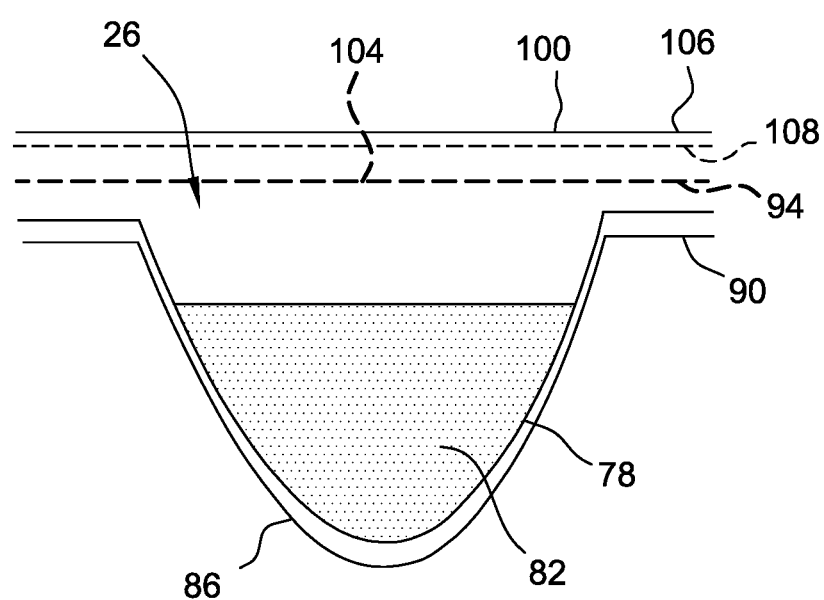
FIG. 3 is an exploded cross-sectional view of an embodiment of a scent capsule including a substance diffusing membrane according to the present disclosure.

With reference to FIGS. 1-3, an air freshener 10 is shown. The air freshener 10 can be utilized to provide and aesthetically pleasing scent and/or neutralizing agent in a desired area, such as a vehicle. In one embodiment, the air freshener 10 is configured to be secured in a vehicle, such as by being held or clipped to louvers of an air vent, sun visor or the like. In one embodiment, the air freshener 10 can be used with a scent capsule 14 with a releasable seal covering a permeable membrane prior to use. The air freshener 10 can resist leaking or spilling of a fragrant material, including an amount of fragrant material that permeates through the permeable membrane and accumulates between the permeable membrane and the releasable seal defining a leak pool of fragrant material. In addition, the air freshener 10 can provide a simple and adjustable scent release.

In one embodiment, the air freshener 10 comprises a scent capsule 14 carried by a housing 18. The housing 18 can comprise a pair of shells, including a front and/or outer shell 22 and a rear and/or inner shell 24 that together form a cavity therebetween for housing the scent capsule 14. In other embodiments, the housing 18 may be a single unitary piece having a cavity for housing the scent capsule 14 therein. In one embodiment, the scent capsule 14 can be disposed in the cavities of the shells 22, 24 and between the shells. In one embodiment, the desired scent from the scent capsule 14 can escape from between the plates around a perimeter of the air freshener 10. In addition, or in the alternative, the desired scent from the scent capsule can escape through holes in the housing, or through an open area of the housing 18, such as on a rear portion of the housing 18. In one embodiment, the pair of shells, or outer and inner shells 22 and 24, may be pivotally, rotatably or slidably coupled together to allow the shells 22 and 24 to move apart from one another, or to expose a larger or smaller opening, such as gap 36, to allow respectively more or less fragrant material to disperse from the scent capsule.

In one embodiment, outer and inner shells 22 and 24 are separated from one another by a gap 36 therebetween, around at least a portion of an outer perimeter of each shell. The gap 36 can extend around at least a portion of, or an entirety of, a lateral perimeter of the air freshener 10 or housing 18, to allow release of scent from the housing.

Although FIG. 1 shows a housing 18 having a circular shape, in embodiments, the housing 18 may have any shape, such as circular, oval, rectangular, triangular, polygonal or any other shape to allow the air freshener 10 to function as described herein.

In one embodiment, the scent capsule 14 comprises a reservoir 78 for containing a fragrant material 82. The fragrant material 82 can be a liquid, such as an oil, water or alcohol based solution with an added desired fragrance or scent, and in some embodiments a desired color that can correspond to the fragrance or scent. In embodiments, the reservoir 78 can comprise a bowl or vessel 86 with a cavity 94 therein. In one embodiment, the scent capsule 14 has a flange 90 circumscribing the perimeter of vessel 86 and the cavity 94.

In some embodiments, the reservoir 78 and/or vessel 86 can be formed by or can include a sheet, such as a transparent or translucent plastic, having an indentation on one side to form the reservoir 78 or vessel 86 circumscribed by flange 90. In one embodiment, the reservoir 78 or vessel 86 is formed by vacuum forming a plastic sheet to the desired shape. In another embodiment, the vacuum formed sheet may be die cut to further refine, or detach the reservoir 78 or vessel 86 from the vacuum formed plastic sheet. In some embodiment, reservoir 78 and vessel 86 may be the same part, or may be joined together to form a unitary component. In other embodiments, reservoir 78 and vessel 86 may be separately formed of the same or different materials, and the reservoir 78 may be placed within vessel 86.

The scent capsule 14 or has a front surface 16 and an opposing rear surface 20. In one embodiment, the scent capsule 14 has a substantially constant thickness. In other embodiments, the thickness of the scent capsule may vary in certain regions thereof to add additional strength or flexibility. In embodiments, the scent capsule may be formed from transparent or at least translucent material, or have at least a portion thereof that is transparent or translucent, such as to allow a user to gauge a quantity of fragrant material 82 held therein.

In one embodiment the scent capsule 14 is held within the housing 18 such that at least a portion of the reservoir 78 or vessel 86 is disposed in an aperture 60 of the outer shell 22 such that the reservoir 78 or vessel 86 is visible from an outside of the housing 18. In some embodiments, the front surface 16 of the scent capsule 14 is sized and configured to be substantially flush with an outer surface of the outer shell 22. In this embodiment, the fragrant material 82 can be viewed to allow a user to identify an amount of fragrant material 82 left within the scent capsule 14. In some embodiments, the scent capsule 14 may have gauge markings formed into or printed onto the vessel 86 that allow a user to easily tell how much fragrant material is contained therein. For example, the gauge markings may include "full," "half," "empty" and the like, or may alternatively include fluid level markings in milliliters, ounces or the like. In some embodiments, the vessel 86 and the aperture 60 may include matching shapes, such as a circular perimeter to allow the vessel 86 to have a flush appearance when placed into housing 18.

An opening to the cavity of the vessel or reservoir is covered by a permeable membrane 94 defining the vessel 86 between the rear surface 20 of the scent capsule 14 and the permeable membrane 94. Thus, the vessel 86 is defined by and completely enclosed by the permeable membrane 94. In one embodiment, the permeable membrane 94 is substantially flat or planar, and extends across the entirety of the opening 26 of the vessel 86. In one embodiment, the permeable membrane 94 also extends across the flange 90 of the vessel 86. In another embodiment, the reservoir 78 is formed by the vessel 86 and the permeable membrane 94.

In one embodiment, the permeable membrane 94 is adhered or welded to the flange 90. In some embodiments, the permeable membrane 94 is adhered to the flange using an adhesive. In other embodiments, the permeable membrane is adhered to the flange 90 without the use of adhesive, and is welded to the flange 90 by heat, friction, induction, crimping or the like. In some embodiments, the permeable membrane is made of HPMV, polyethylene (PE), high density polyethylene (HDPE), polyolefins having random orientation of fibers and the like and combinations thereof. The permeable membrane 94 is configured, for example through material selection and/or mechanical or laser machining, to allow a fragrance of the fragrant material 82, and/or the fragrant material 82 to disperse or permeate through the permeable membrane 94 over time to release the fragrance into the surrounding air. In one embodiment, the permeable membrane 94 is configured to be substantially permeable to air, gas or vapor, while being substantially impermeable to liquids or oils.

In order to prevent the premature release of the fragrant material 82 through the permeable membrane 94, a removable seal 100 is sealed over permeable membrane 94 to prevent or substantially prevent fragrance release until removed. Thus, the removable seal 100 is disposed over the permeable membrane 94 prior to use and removable therefrom to initiate use. To prevent pooling of fragrant material 82 between the permeable membrane 94 and the removable seal 100, the removable seal 100 is adhered to the permeable membrane 94 across an entirety of the outer surface 104 of the permeable membrane 94. In one embodiment, the removable seal is a laminate structure having at least a first layer 106 and a second layer 108. In one embodiment, the first layer 106 is made of a foil, such as a metallic foil or the like/ The second layer 108 may be made from of polyethylene (PE) or high-density polyethylene (HDPE) and the like.

It is important that although the removable seal 100 is adhered to the permeable membrane 94 across an entirety of the outer surface 104 of the permeable membrane 94, it must still be easily removable by a user when desired in order to begin use of the air freshener 10. In one embodiment, the removable seal 100 includes a tab 102 to aid in removing the removable seal from the permeable membrane 94. In the embodiment shown in FIG. 3, the second layer 108 is adhered directly to the permeable membrane 94.

Accordingly, in one embodiment, to adhere the releasable seal 100 to the permeable membrane 94, a process is used to eliminate the use or need for any adhesives. In this embodiment, the permeable membrane 94 is coated with a layer of amorphous silica. In one suitable embodiment, the amorphous silica is poured directly onto the permeable membrane 94, and then excess amorphous silica is removed using a cloth, brush or the like. In such embodiments, it the amorphous silica may be in the form of a fine silt. In one embodiment, the amorphous silica is substantially pure amorphous silica having no added binders, solvents or additives. It should be noted that "substantially pure" may mean that some small amount of impurities are present such that it does not affect the binding of the amorphous silica to the permeable membrane and the second layer 108 and allows the air freshener 10 to function as described herein. After the amorphous silica layer has been coated onto the permeable membrane 94, the removable seal is then adhered thereto according to the disclosure herein.

Figure 4:
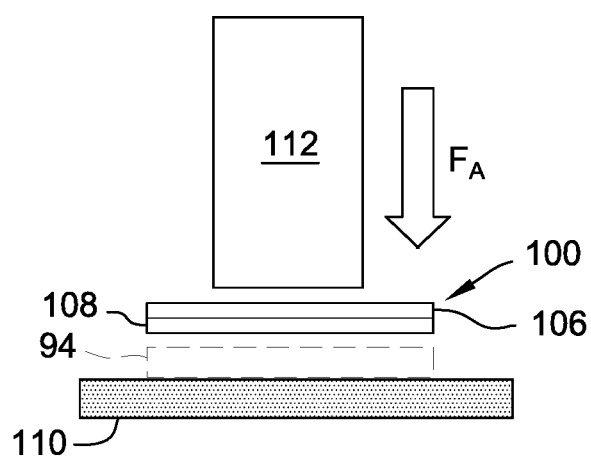
FIG. 4 is a schematic view of a permeable membrane and removable seal in a press according to the present disclosure.

In one embodiment, to adhere the amorphous silica coated permeable membrane 94 to the removable seal 100, a suitable pressure and or temperature is applied to one or both of the removable seal 100 and the permeable membrane 94 while the second layer 108 is in contact with the outer surface 104 of the permeable membrane 94. With reference to FIG. 4, in this embodiment, the removable seal 100 and the permeable membrane 94 are placed onto a base 110 of a press 112. The press 112 applies a force in the direction $F_A$ to the first layer 106 of the removable seal 100. Accordingly, the permeable membrane 94 is thus sandwiched between the base 110 and the second layer 108 of the removable seal 100. The force in the direction $F_A$ is applied by the press for a predetermined period of time that allows for the amorphous silica coated permeable membrane 94 to fully adhere across the entirety of upper surface 104 to the second layer 108. In embodiments, the time period of the applied force may range from about 0.02 to 5 seconds. In another embodiment, heat may be applied to one or both of the base 110 or press 112 during the force being applied. The temperatures of the press 112 and the base 110 may be controlled to be within a range of from. In another embodiment, the temperature may be controlled to change, increase or decrease during the application of the force, and in other embodiments the heat may be applied for a predetermined amount of time that may be less than, equal to, or greater than the time period for which the force is applied. In any such embodiment, the applied force and/or pressure should be sufficient to adhere the amorphous silica coated permeable membrane 94 to the removable seal 100, such that an entirety of the upper surface 104 of the permeable membrane 94 is adhered to the second layer 108 of the removable seal 100. After the adhering process is complete, the bonded permeable membrane 94 and removable seal 100 structure is removed from the press 112.

In one embodiment, subsequent to the above described adhering process, the bonded permeable membrane 94 and removable seal 100 structure is then adhered to the flange 90 of the housing 18 as described herein. In another embodiment, permeable membrane 94 may be adhered to the flange 90 of the housing 18 prior to bonding the permeable membrane 94 to the removable seal 100. In embodiments, the permeable membrane 94 is adhered to the flange using an adhesive. In other embodiments, the permeable membrane is adhered to the flange 90 without the use of adhesive, and is welded to the flange 90 by heat, friction, induction, crimping or the like.

As described herein, the removable seal 100 is releasably secured to the permeable membrane 94. When the customer receives the air freshener 10, he or she can remove the removable seal 100 covering the permeable membrane 94 to begin the scent release. In one embodiment, the tab 102 can extend from the removable seal 100, and beyond the housing, such as between the pair of shells, to be grasped and pulled by a user in order to remove the seal from the scent capsule.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air freshener comprising:
    a reservoir for storing a liquid fragrant substance, the reservoir comprising a cavity and an opening to the cavity;
    a permeable membrane coupled to the reservoir and having a first surface facing the cavity that covers the opening and a second surface facing away from the cavity, the second surface being coated with amorphous silica; and
    a laminate removable seal comprising a metallic layer and a sealing layer, the laminate removable seal disposed on the second surface of the permeable membrane, the amorphous silica removably binding the sealing layer to substantially an entirety of the second surface of the permeable membrane.

2. The air freshener according to claim 1, wherein the metallic layer comprises aluminum.

3. The air freshener according to claim 1, wherein the sealing layer is heat sealed to the second surface without an adhesive.

4. The air freshener according to claim 1, wherein the amorphous silica is disposed within at least some pores of the permeable membrane.

5. The air freshener according to claim 1, wherein the sealing layer comprises polyethylene.

6. The air freshener according to claim 5, wherein the permeable membrane is adhered to a flange of the reservoir, the flange encircling the opening.

7. A method of sealing a reservoir containing a fragrant liquid, the reservoir comprising a cavity containing the fragrant liquid and an opening to the cavity, the method comprising:
    covering the opening with a permeable membrane having a first surface facing the cavity and a second surface facing away from the cavity;
    applying amorphous silica to the second surface;
    applying a laminate removable seal comprising a metallic layer and a sealing layer to the second surface of the permeable membrane; and
    applying heat and pressure to the laminate removable seal such that the amorphous silica removably binds the second surface of the permeable membrane to the sealing layer across substantially the entirety of the second surface of the permeable membrane.

8. The method according to claim 7 wherein the permeable membrane is adhered to a flange of the reservoir, the flange encircling the opening.

9. The method according to claim 7, wherein the metallic layer comprises aluminum.

10. The method according to claim 7, wherein no adhesive is applied between the sealing layer and the permeable membrane.

11. The method according to claim 7, wherein the applied heat and pressure are sufficient to create van der walls forces between the second surface and the sealing layer.

12. The method according to claim 7, wherein the heat and pressure are applied for between 0.5 and 1.0 seconds.

13. The method according to claim 7, further comprising applying dry nano-particulate amorphous silica to the second surface and removing excess nano-particulate amorphous silica prior to applying the laminate removable seal to the second surface.

14. The method according to claim 7, wherein the sealing layer is removably adhered across substantially the entirety of the second surface prior to the permeable membrane covering the opening.

15. The method according to claim 7, wherein the sealing layer is removably adhered across substantially the entirety of the second surface of the permeable membrane such that substantially no liquid is between the sealing layer and the second surface.

16. The method according to claim 7, wherein the permeable membrane comprises HPMV.

17. An air freshener comprising:
- a reservoir for storing a liquid fragrant substance, the reservoir comprising a cavity and an opening to the cavity;
- a permeable membrane coupled to the reservoir and having a first surface facing the cavity that covers the opening and a second surface facing away from the cavity, wherein the second surface of the permeable membrane is coated with amorphous silica; and
- a removable seal removably adhered to substantially the entirety of the second surface of the permeable membrane by the amorphous silica.

18. The air freshener according to claim 17, wherein the removable seal is heat sealed to the second surface of the permeable membrane without an adhesive.

19. The air freshener according to claim 17, wherein the removable seal is a laminate removable seal comprising a metallic layer and a sealing layer.

20. The air freshener according to claim 19, wherein the sealing layer comprises polyethylene.

\* \* \* \* \*